United States Patent
Tomaszewski et al.

(10) Patent No.: US 6,978,345 B2
(45) Date of Patent: Dec. 20, 2005

(54) SELF-MIRRORING HIGH PERFORMANCE DISK DRIVE

(75) Inventors: Richard J. Tomaszewski, Houston, TX (US); Steven Eugene Fairchild, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/855,483

(22) Filed: May 15, 2001

(65) Prior Publication Data

US 2002/0188800 A1 Dec. 12, 2002

(51) Int. Cl.$^7$ ............................. G06F 12/00; G11C 5/00
(52) U.S. Cl. ............................. 711/112; 711/114; 360/8
(58) Field of Search ............................. 711/112, 114; 360/8

(56) References Cited

U.S. PATENT DOCUMENTS

| | | | |
|---|---|---|---|
| 2,628,346 A | 2/1953 | Burkhart ..................... 340/174 |
| 3,761,903 A | 9/1973 | Bird, Jr. et al. .......... 340/174.1 |
| 4,302,783 A | 11/1981 | Mima et al. ................... 360/47 |
| 4,750,106 A | 6/1988 | Aiken, Jr. .................... 364/200 |
| 4,772,963 A | 9/1988 | Van Lahr et al. ............. 360/47 |
| 5,237,466 A | 8/1993 | Glaser et al. ............ 300/73.03 |
| 5,341,361 A | 8/1994 | Hosaka .................... 369/275.3 |
| 5,422,761 A | 6/1995 | Anderson et al. ............. 360/47 |
| 5,463,758 A | * 10/1995 | Ottesen ....................... 395/441 |
| 5,630,104 A | 5/1997 | Ottesen et al. .............. 395/500 |
| 5,707,727 A | * 1/1998 | Takahashi .................... 428/332 |
| 5,724,539 A | 3/1998 | Riggle et al. ............... 395/427 |
| 5,737,577 A | 4/1998 | Martini .................... 395/467.04 |
| 5,787,242 A | * 7/1998 | DeKoning ............. 395/182.01 |
| 5,872,800 A | * 2/1999 | Glover ....................... 371/40.4 |
| 5,991,501 A | 11/1999 | Higurashi et al. ............ 386/98 |
| 6,018,790 A | 1/2000 | Itoh et al. .................... 711/114 |
| 6,023,384 A | 2/2000 | Anderson et al. ............. 360/48 |
| 6,028,725 A | * 2/2000 | Blumenau ...................... 360/8 |
| 6,061,194 A | 5/2000 | Bailey ......................... 360/47 |
| 6,070,225 A | 5/2000 | Cheung et al. ............. 711/112 |
| 6,092,087 A | * 7/2000 | Mastors ....................... 707/202 |
| 6,163,422 A | 12/2000 | Blumenau ..................... 360/47 |
| 6,412,042 B1 | * 6/2002 | Paterson ..................... 711/112 |
| 2002/0083299 A1 | * 6/2002 | Van Huben et al. .......... 712/29 |

* cited by examiner

Primary Examiner—Kimberly McLean-Mayo

(57) ABSTRACT

A disk drive system including one or more platters, each platter supporting at least one recording surface, where the platters are aligned about a common central axis. The platters spin about the common central axis. A recording head is associated with each recording surface. An actuator mechanism couples to each recording head to move the recording head into proximity with selected portions of the recording surface in response to received commands. At least two replicates of data are stored in at least two data storage areas such that any one of the at least two replicates can be accessed to service a data access request.

26 Claims, 7 Drawing Sheets

FIG. 9

| | 7 | 6 | 5 | 4 | 3 | 2 | 1 | 0 |
|---|---|---|---|---|---|---|---|---|
| 0 | Operation Code (C8h) ||||||||
| 1 | Reserved ||| DPO | FUA | Reserved || RELADR |
| 2–5 | Logical Block Address ||||||||
| 6 | Replicate Number ||||||||
| 7–8 | Transfer Length ||||||||
| 9 | Control ||||||||

FIG. 10

| | 7 | 6 | 5 | 4 | 3 | 2 | 1 | 0 |
|---|---|---|---|---|---|---|---|---|
| 0 | Operation Code (C9h) ||||||||
| 1 | Reserved |||||  RRDE | RDEOnly | FRC |
| 2–6 | Reserved ||||||||
| 7–8 | Transfer Length (0Eh) ||||||||
| 9 | Control ||||||||

FIG. 11

| 7 | 6 | 5 | 4 | 3 | 2 | 1 | 0 |
|---|---|---|---|---|---|---|---|
| 0 | Redundant Data Entry Length (0Dh) ||||||||
| 1 | NoRDE | Reserved |||||||
| 2-5 | Logical Block Address ||||||||
| 6 | Replicate Source ||||||||
| 7 | Replicate Number ||||||||
| 8-9 | Transfer Length ||||||||
| 10-13 | Replicate Identifier ||||||||

FIG. 12

| | 7 | 6 | 5 | 4 | 3 | 2 | 1 | 0 |
|---|---|---|---|---|---|---|---|---|
| 0 | Operation Code (53h) |||||||||
| 1 | Reserved | Reserved | Disable XOR | DPO | FUA | Disable Write | Reserved | Reserved |
| 2-5 | Logical Block Address |||||||||
| 6 | Reserved |||||||||
| 7-8 | Transfer Length |||||||||
| 9 | Control |||||||||

SELF-MIRRORING HIGH PERFORMANCE DISK DRIVE

BACKGROUND OF THE INVENTION

1. Field of the Invention

The present invention relates, in general, to mass storage devices, and, more particularly, to software, systems and methods for implementing high performance disk drives using self-mirroring within the drive.

2. Relevant Background

Computing systems are used to manipulate and store large quantities of data used in commerce, government and research. While the instruction rate at which data processors can perform has increased dramatically over recent years, the input/output (I/O) rate at which data can be supplied to processors has not increased proportionately. Accessing mass data storage systems remains a critical bottleneck limiting the overall performance of many computing systems.

Mass data storage systems strive to provide high storage density with low latency access to the stored data. Disk drive manufacturers continue to provide increasingly higher densities of data storage in storage devices using magnetic, optical, magneto-optical and other storage technologies. Advancements in hard disk magnetic recording technology are enabling the doubling of disk capacity every year.

Disk drives typically comprise one or more disks or platters having a recording media formed on one or more of the disk surfaces. A read/write head attached to an actuator mechanism moves across the disk between inner and outer diameters while the platters spin. Read channel electronics read and write data onto the disk surfaces as well as reading formatting, control and servo data recorded on the disk surface. Servo control electronics coupled to the read channel and the actuator mechanisms use servo control data and high-resolution servo data (e.g., servo bursts) recorded on the media surface to locate particular tracks and align the head over the centerline of selected tracks in response to read/write commands.

By carefully controlling spin speed and actuator movement, data can be accessed with great precision. Although capacity improvements in early disk drives came from adding more platters within a single enclosure, more recently improvements arise from decreasing the track size and recording rate to improve the areal density of the disk drive system. Continuing improvements in media properties, read channel electronics, and servo control systems are expected to lead to continuing higher areal densities.

However, hard disk performance in terms of reduced latency is only improving 15% to 30% a year. Latency in a disk drive system is primarily determined by the seek time and the rotational latency. Other contributing factors to latency, including various processing time required to process commands, tend to be minor. Seek time refers to the time required to position a read/write head over a selected track on a disk drive surface. Rotational latency refers to the time required for the desired location on a track to rotate under the read/write head and is largely a factor of spin speed of the rotating media.

There is a continuing need for higher performance hard disk drives. To achieve high performance customers use multiple drives in RAID (redundant array of independent disks) configurations such as RAID level 0 and RAID level 1 mirroring. Mirroring allows a data set to be spread out or "striped" across many disk drives or spindles so that latency associated with accessing each drive can be overlapped. When choosing to spread data across many spindles customers often choose smaller capacity drives over larger capacity drives driven by overall solution cost and the total capacity needed. There is a trend today that individual drive capacity is larger than what customers need.

While mirroring across multiple drives has improved performance in multiple-drive systems, until now, only a few strategies have existed to reduce latency within the drive itself. The mechanics of the head and actuator mechanisms limit the acceleration and speed at which a head can be moved between inner and outer diameters of the disk. Hence, seek latency is difficult to reduce. However, smaller disks and "short-stroking" (i.e., causing the actuator to move over less than all of the disk surface) have been used to lessen seek latency. In the case of solutions like short-stroking, disk capacity is simply discarded to improve performance. It would be preferable to implement a system that could use this capacity productively to improve performance rather than simply throwing it away.

Rotational latency is conventionally addressed by increasing the rotational speed of the platters. In recent years spin speed has increased to 7200 rpm in consumer disk drives, while 10,000 rpm and 15,000 rpm drives are available in enterprise class drives. However, increasing spin speed has several drawbacks. Higher spin speeds create more vibration, oscillation, and media flutter making it correspondingly difficult to precisely position the head during read/write operations. Also, the read channel and servo electronics must be able to handle the increased data rate. Moreover, faster spinning drives require more power making them impractical for many portable electronic devices. As a result, increasing the spin speed of drives by itself is not expected to provide adequate performance improvements in the near future. Hence, a need exists to provide the benefits of higher spin speeds disk drives without the associated drawbacks that increase cost and reduce performance.

SUMMARY OF THE INVENTION

Briefly stated, the present invention involves a disk drive system including one or more platters, each platter supporting at least one recording surface, where the platters are aligned about a common central axis. The platters spin about the common central axis. A recording head is associated with each recording surface. An actuator mechanism couples to each recording head to move the recording head into proximity with selected portions of the recording surface in response to received commands. At least two replicates of data are stored in at least two data storage areas such that any one of the at least two replicates can be accessed to service a data access request.

BRIEF DESCRIPTION OF THE DRAWINGS

FIGS. 9–12 illustrate exemplary command definitions for an exemplary set of new commands added to implement features of the present invention.

DETAILED DESCRIPTION OF THE PREFERRED EMBODIMENTS

Figure 1A:
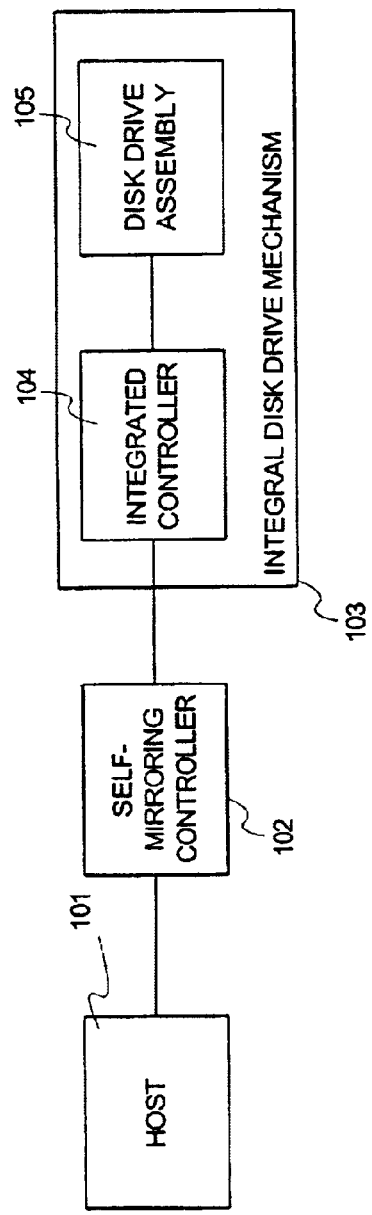
FIG. 1A and FIG. 1B illustrate alternate implementations of systems in accordance with the present invention in functional block-diagram form.

The present invention is based on a recognition that high-performance mass storage devices often do not need to be the highest capacity drives. Instead they may be at the middle or low end of a normal capacity distribution. For example, there is typically a spread of capacities that encompass a mainstream capacity and capacities that are multiples above and below the mainstream. In today's terms, that would mean, 18 GB is the mainstream volume leader with 9 GB seeing a declining volume and 36 GB seeing an increasing volume.

The present invention uses this trend by taking the emerging capacity (in this case 36 GB) and strategically reducing its capacity to the mainstream capacity (18 GB). The excess capacity is used to store redundant copies of the user's data. Each of the redundant copies is referred to as a replicate. Done properly, this can reduce the rotational latency to retrieve the data. The preferred embodiment places the redundant data in radial opposition, i.e. 180 degrees offset for a two-copy implementation.

The present invention is illustrated and described in terms of a disk drive which can be configured to a high performance mode where the capacity of the disk drive is halved while improving performance significantly through internally replicating the data in a radially opposed fashion. This disk drive appears to a host computer as a single disk drive. The disk drive includes mechanisms to automatically duplicate received data on writes to multiple locations, manage background tasks of redundant writes, maintain metadata to ensure data coherency and choose to access data from the closer of multiple copies of radially opposed data on reads. Simple two-way mirroring described above is expected to reduce rotational latency by up to one-half. The present invention is readily extended, however, to allow for implementation in a fashion where capacity is reduced even further than one half by, for example, using 3-way, 4-way, or n-way mirroring. N-way mirroring results in a capacity that is reduced by N and rotational latency is reduced by a factor of 1/N.

The reduced latency allows a drive to achieve a virtual RPM (revolutions per minute) boost. This boost reduces one of the three major contributors to drive response time, rotational latency. The other major contributors, access time and data transfer rate are not negatively affected and in some embodiments can be improved as well. The advantage of this approach is that penalties replicated with higher spin speeds to reduce rotational latency can be avoided.

The teachings of the present invention are readily extended to other rotating media mass storage devices. Optical disk drives such as CDROM, and DVDROM exhibit similar rotational latency issues and can benefit from the present invention. Both read-only and re-writeable technologies can benefit. Other media types, including magneto-optic and perpendicular magnetic recording media are also suitable substitutes for the preferred materials disclosed herein in particular applications.

Figure 1B:
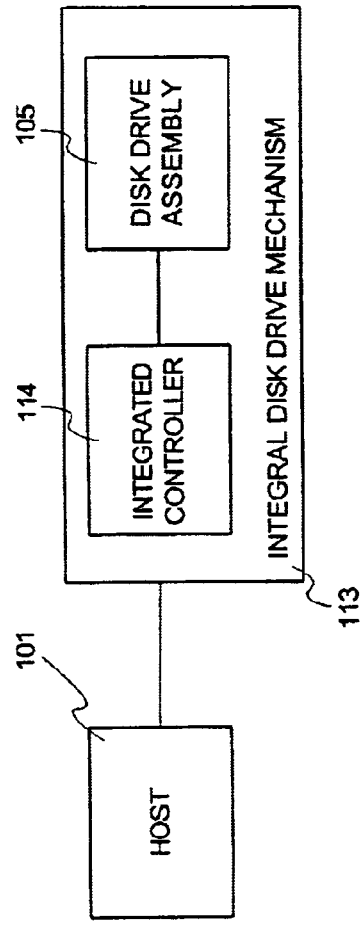

FIG. 1A and FIG. 1B illustrate alternate implementations of systems in accordance with the present invention in functional block-diagram form. In both implementations, a host computer 101 conducts data storage transactions with an integral disk drive mechanism 103/113. These data storage transactions typically involve read and write commands that specify particular logical block addresses at which the transaction is to occur.

The integral disk drive mechanism 103/113 include a disk drive assembly 105 in which data storage media, read/write electronics, and motors are enclosed. Disk drive assembly 105 essentially implements a plurality of blocks of physical data storage capacity. Upon receiving appropriate commands, disk drive assembly executes a data read or write command at a specified physical location. Preferably, the present invention is implemented with minimal or no changes to conventional disk drive assemblies such that the invention can leverage the rapidly evolving features of drive technology.

The disk drive assembly 105 is coupled with a controller 104/114 that receives disk access commands that specify logical addresses used by host 101. Controller 104/114 includes a data processor and memory for storing and executing software/firmware instructions that implement received data storage requests. The data processor comprises, for example, a microcontroller or microprocessor. Memory includes, for example, volatile memory such as dynamic random access memory (e.g., DRAM, SDRAM, DDRAM and the like) and/or non-volatile memory such as erasable programmable read only memory (EPROM) or the like. Controller 104/114 operates to, among other things, map logical addresses used by host 101 to physical addresses used by the disk drive mechanism 103/113 and more particularly to generate analog and digital commands that are understood by motors and read channel electronics of disk drive assembly 105. For example, controller 104/114 includes mechanisms to read servo position data and servo bursts from the data storage media and position the read/write head over particular tracks and locations within a track on the data storage media.

The present invention involves the addition of a small number of specialized commands and functions that implement self-mirroring. These include, for example, mechanisms to write data to two or more physical locations when host 101 specifies a write to a single locations. Similarly, these mechanisms select which replicate of stored data will be read when host 101 specifies reading data from a particular logical address. Further, these mechanisms include functions for maintaining coherency between replicated copies of stored data, preferably including maintaining coherency in the event of power loss. The implementations of FIG. 1A and FIG. 1B differ essentially in where this additional functionality is implemented.

In the implementation of FIG. 1A, a self-mirroring controller 102 is provided between the host 101 and the disk drive mechanism 103. Hence, in the embodiment of FIG. 1A, disk drive mechanism 103 can be implemented with minimal changes to a conventional off-the-shelf disk drive mechanism in that most of the functions required to implement self-mirroring are implemented outside the drive mechanism. In contrast, the implementation of FIG. 1B involves modification of the firmware and data processing within the integrated controller 114 thereby eliminating need for an external self-mirroring controller 102. In both implementations, host 101 issues a conventional disk access command and self-mirroring is handled invisibly by replicating the command to appropriate physical locations, and buffering or caching replicated requests to hide overhead associated with mirroring and/or coherency operations.

Figure 2:
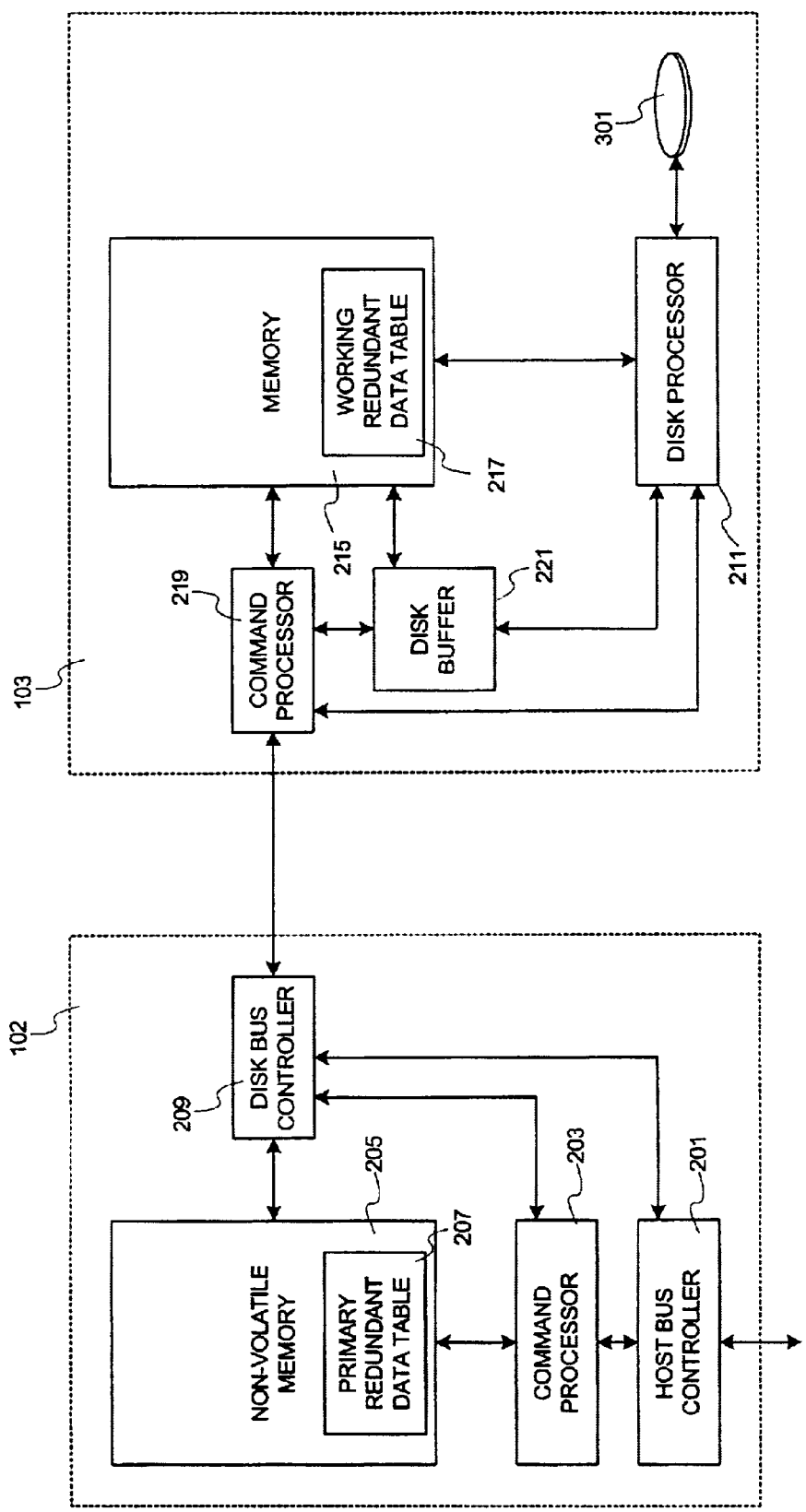
FIG. 2 shows cooperating components in a particular implementation of the present invention in block-diagram form.

FIG. 2 shows cooperating components in a particular implementation, consistent with the implementation of FIG.

1A, in block-diagram form. FIG. 2 shows details of components within self-mirroring controller 102. In the embodiment shown in FIG. 1B essentially all of the components shown in FIG. 2 would be implemented in an integrated controller 114. The implementation of FIG. 2 is based on a conventional PC-based architecture using a peripheral component interconnect (PCI) bus or CompaqPCI bus to couple to host 101, and a small computer system interconnect (SCSI) interface to couple to the disk drive mechanism. However, other architectures, interfaces and bus designs, such as integrated drive electronics (IDE) interface, are readily substituted to meet the needs of a particular applications.

Host bus controller 201 interfaces with the host bus coupling to host 101. Host bus controller serves to communicate commands (e.g., address, data, and command codes) with external devices and implement bus-specific electrical and timing standards. While a host computer 101 is used in the particular examples, any device coupled to the host bus may communicate with host bus controller 201 in a similar manner. Command processor 203 interprets received commands and generates signaling, and control information to disk bus controller 209 (e.g., a SCSI bus controller).

Non-volatile memory 205 is used to cache or buffer data for both read and write commands. A primary redundant data table (PRDT) is implemented in memory 205. The PRDT, as well as working redundant data table (WRDT) 215 store metadata indicating which redundant operations must be processed and state information indicating which redundant copies are valid. For example, the redundant data tables include a mapping of logical block addresses to two or more physical block addresses, queued read/write operations that are pending against the addresses, and state information. Because PRDT 207 is preferably implemented in non-volatile memory, in the event of power loss multiple pending write operations can be cohered upon restoration of power through appropriate processing.

Integrated controller 103 includes a command processor coupled to the disk bus to receive commands from disk bus controller 209. These commands include read, read replicate, write, and notify commands. Commands and signaling protocols are also preferably implemented to identify hardware that is capable of self-mirroring operation and to enable self-mirroring operation in accordance with the present invention. This type of signaling can be implemented using, for example, the peripheral device mode page which is specified in the SCSI standard, but for the most part no longer used. The peripheral device mode page (page code=0x09H) includes numerous fields that are available for storing configuration and state information and is used by some manufacturers to specify proprietary or system-specific data. This page is described, for example, in the "Compaq Common SCSI Specification" document available as part number HDDQ61 from Compaq Corporation and incorporated herein by reference. In a particular example, the present invention modifies the peripheral device mode page to include the fields set out in Table 1.

TABLE 1

| Field | Description |
| --- | --- |
| DCS (Disable Coherence Scan) | When set, the drive will disable the idle time coherence scan. This is an optional diagnostic feature to allow the host to be notified of data corruption. |

TABLE 1-continued

| Field | Description |
| --- | --- |
| ERDM (Enable Redundant Data Mode) | When set, the target is operating in a Redundant Data Mode. The Number of Replicates field defines the extent of the redundant data and the underlying capacity. The switch to or from Redundant Mode may require a reformat of the drive. If the format is required, a read operation should return an error code indicating the "medium format is corrupted". |
| RDC (Redundant Data Capable) | When set, the target is capable of supporting Redundant Data. This bit is not changeable and is set based on target functional capabilities and shall be set to zero (0) by default. |
| Number of Replicates | This savable field indicates the number of replicates actively defined. A change in the number of replicates may require a reformat of the drive when ERDM is set. If the format is required, a read operation should return an error code indicating the "medium format is corrupted". This value must be less than or equal to the Maximum Number of Replicates. A value of 0 is equivalent to disabling the ERDM field. |
| Maximum Number of Replicates | This field indicates the maximum number of replicates that a device may support. This field is not changeable and is set based on the functional capabilities and shall be set to zero (0) by default. The maximum number of replicates is 15. |

Integrated controller 103 also includes a disk processor 213 that receives head position commands from command processor 219 and executes the received commands. Disk processor 213 monitors servo data, including servo position data and servo burst data, to generate control signals to the servo and spin motors that control the positioning of the read/write head within disk drive assembly 105 properly with respect to the surface of data storage disk 301.

Disk buffer 221, which may be implemented integrally with disk memory 215, functions as a buffer/cache to minimize latency associated with disk access requests. Memory 215 provides working memory for execution of commands, and implements WRDT 217. Redundant disk access requests are executed with reference to WRDT 217 to identify the multiple physical addresses at which replicates are located, and to maintain state information in a manner similar to PRDT 207. In a particular example, WRDT 217 is implemented in volatile memory such as DRAM or SRAM so that access is fast. Although volatile memory will lose its contents upon loss of power, the contents can be reconstructed from data stored in PRDT 207. Alternatively, WRDT 217 may also be implemented in non-volatile memory.

Operation of the present invention is usefully illustrated by describing the read and write operations. The self-mirroring controller 102 provides additional processing power and a relatively large non-volatile memory subsystem (e.g., battery-backed cache). This avoids having to place non-volatile memory on the drive. The drive subsystem 103 provides the necessary understanding of the low-level data layout and device control. This avoids having to make self-mirroring controller 102 continuously aware of the mechanics of the drive.

To provide a reduced latency on reads, the drive must choose the best (i.e. closest) redundant copy (called a replicate) for data retrieval. The choice of which replicate is used is determined by which command the controller 102 issues to the drive mechanism 103.

When self-mirroring controller 102 issues a SCSI read command, then drive mechanism 103 will assume that the data replicated with the request is coherent and any one of the replicates may be used to satisfy the request. The drive would choose the replicate based on the current contents of the drive queue (e.g., buffer 221) as well as the mechanical position of the actuator and rotational offset of the data on the platter. Optimizations that would allow alterations of the replicate based on updates to the current queue would be possible.

When self-mirroring controller 102 issues the new SCSI Read Replicate command, then drive mechanism 103 will schedule the read to the specified replicate. If the drive has the data from the original write request or from a read ahead from the specified replicate in buffer 221, then the Read Replicate command could be satisfied from buffer 221 like a normal read request. Preferably, drive mechanism 103 may not use the data from the buffer if it is from a replicate other than the replicate specified.

Prior to requesting data from drive mechanism 103, self-mirroring controller 102 determines whether the data being requested is coherent (i.e., all replicates are known to contain the same data). This is determined by searching the primary redundant data table (PRDT) looking for a redundant data entry (RDE) for the request. The RDE is the logical structure that contains at least the logical block address (LBA) corresponding to the replicate and a number of blocks being requested.

If an RDE is found, then the data being requested is not coherent. The RDE is then used to determine which replicate contains the correct data. The command used to retrieve the data from the drive in this case would be the new SCSI Read Replicate command. When an RDE is not found, then the data being requested is coherent. The controller will issue a normal SCSI read command, allowing drive mechanism 103 to select which replicate to read the data from.

To provide reduced latency writes, drive mechanism 103 should be free to choose the order in which the write operations are committed to disk 301. After a first copy is written to disk 301, the drive mechanism 103 should communicate to self-mirroring controller 102 that the command has been completed. Whenever less than all replicates have been written, it is important that self-mirroring controller 102 and drive mechanism 103 share a common perspective as which is the correct replicate. In a particular implementation, this is done with a new SCSI Notify command. When the initial write command is issued to the drive mechanism 103, one or more Notify commands are also issued. The Notify commands act as placeholders to allow the drive mechanism 103 to communicate which replicates have been updated with the new data. When the self-mirroring controller 102 is also told which replicate contains the first copy of the data, it will communicate to the system (e.g., host 101) that the write command has been completed. The update of the remaining replicates is then done in a deferred manner.

The self-mirroring controller 102 keeps track of the deferred writes in PRDT 207. Drive mechanism 103 also keeps track of the deferred writes WRDT 217. As drive 103 has idle time, it works through WRDT 217 and makes the replicates listed in WRDT 217 coherent. When each entry in the WRDT is completed, the replicated Notify command is completed and sent to self-mirroring controller 102. Self-mirroring controller 102 will remove or clear entries from PRDT 207 as they are completed.

Because drive mechanism 103 may have limited computational and memory resources, it is possible under a heavy load for the deferred writes to stall operations until they are completed. To accommodate this eventuality, drive mechanism 103 may choose to return one or more Notify commands as aborted. This would allow the drive to free up its internal resources and rely on the self-mirroring controller 102 to keep track of the outstanding deferred writes in PRDT 207. Drive mechanism 103 may also choose to "offload" or "checkpoint" the deferred writes to disk based on internal aging or activity schemes. This would allow drive mechanism 103 to recover the deferred writes without involvement of self-mirroring controller 102. In such cases, the PRDT and WRDT may not contain the same information.

Drive mechanism 103 may also choose to force the deferred writes to complete in a "one-for-one" scheme to minimize the performance impact. This scheme would allow a single deferred write to occur to free up resources for the next command. If the workload is significantly write intensive, then the delays could be significant because of the overhead replicated with Notify commands.

Self-mirroring controller 102 also has limited resources and it desirably keeps track of multiple drives so that a single controller 102 will support multiple disk mechanisms 103. Hence, self-mirroring controller 102 should be able to control the size of the PRDT 207. This is compounded by the fact that PRDT 207 should be scanned for entries on each command sent to one of the drive mechanisms 103. The scanning process could become excessive and force the self-mirroring controller 102 to reduce the number of deferred writes. Forcing drive mechanism 103 to complete writes reduces the deferred writes. The details of how the self-mirroring controller 102 manages the reduction of the number of deferred writes depends on the particular disk bus implementation, but can be readily developed for any particular bus architecture.

To support a graceful recovery from a power cycle, the self-mirroring controller should inform drive mechanism 103 which replicates are still incoherent at power on. In the particular implementation described herein, the Notify command is also used in this capacity to relay the outstanding deferred writes.

Figure 3:
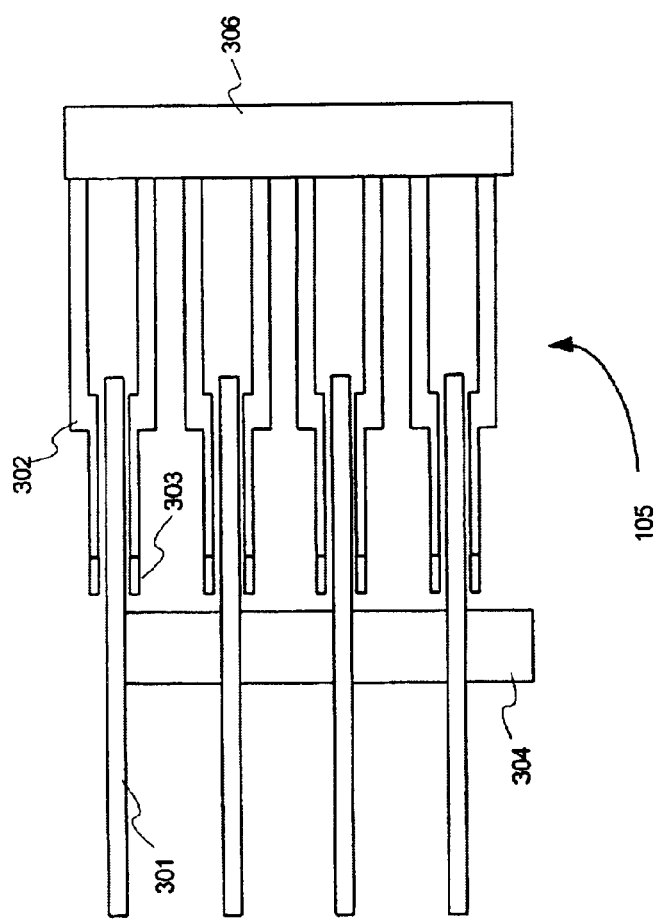
FIG. 3 illustrates a cross-section side view of a hard disk drive in which the present invention is implemented.
Figure 4:
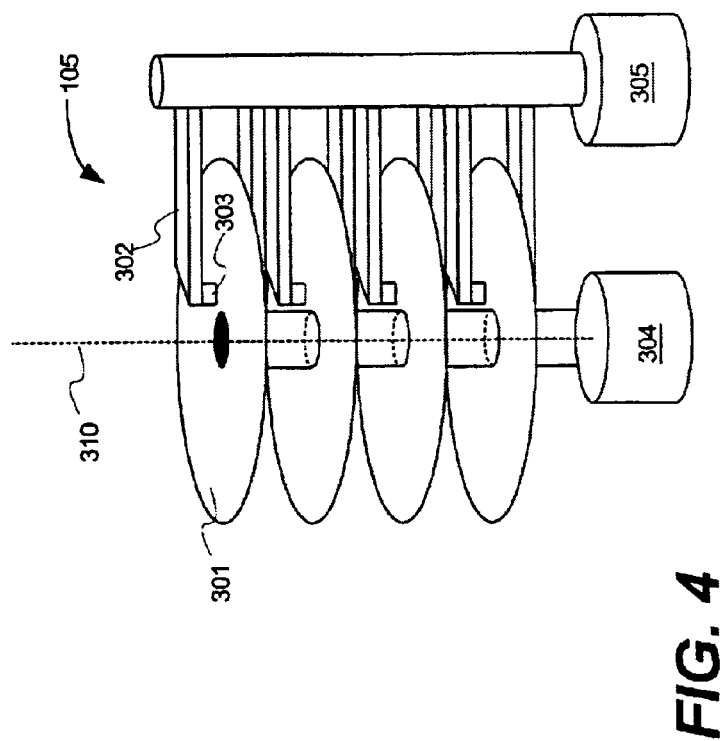
FIG. 4 illustrates a perspective view of a hard disk drive in which the present invention is implemented.

Disk drive assembly 105 is described generally with reference to FIG. 3 and FIG. 4. FIG. 3 illustrates a cross-section side view of a hard disk drive in which the present invention is implemented, whereas FIG. 4 illustrates a perspective view of a hard disk drive in which the present invention is implemented. A plurality of disk recording media 301 are mounted so as to have a common spin axis. The disk recording media 301 are typically formed as a plurality of rigid platters having a magnetic recording media formed on upper and/or lower surfaces. A spin motor 304 turns the platters at a predefined rotational speed, which in the specific implementation is 15,000 RPM. Read/write heads 303 are positioned at particular portions of the disk surface and generate/sense magnetic fields. Actuator 302 moves all of the read/write heads 303 in unison from inner to outer diameter of the media 301 as driven by servo motor 305.

Figure 5A:
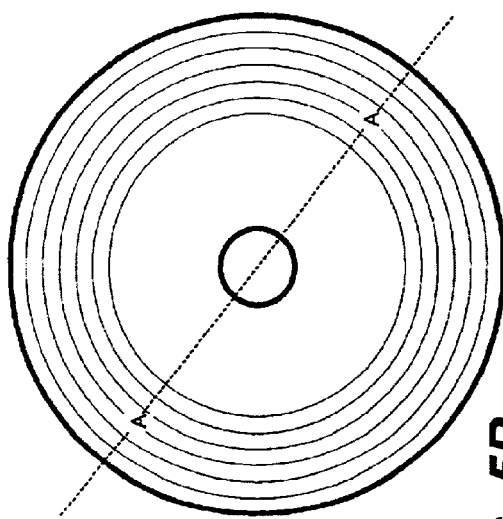
FIG. 5 through FIG. 7 illustrate alternate formats for a particular embodiment of the present invention.
Figure 5B:
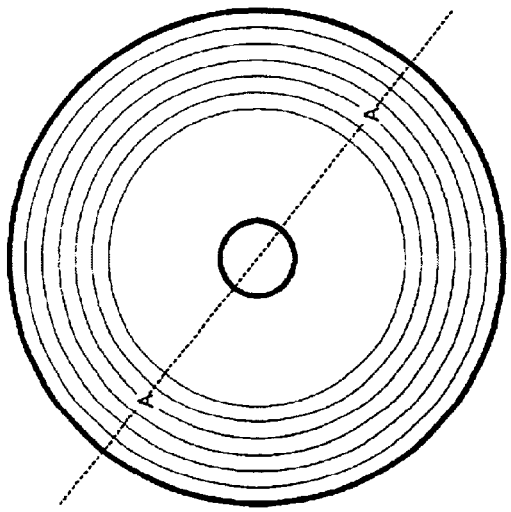
Figure 6:
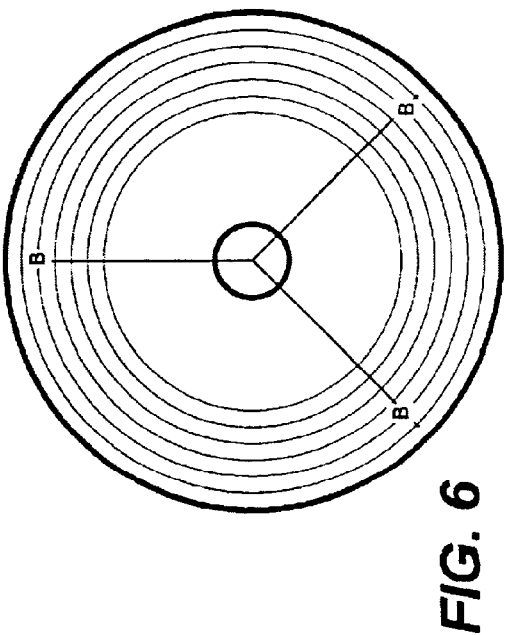
Figure 7:
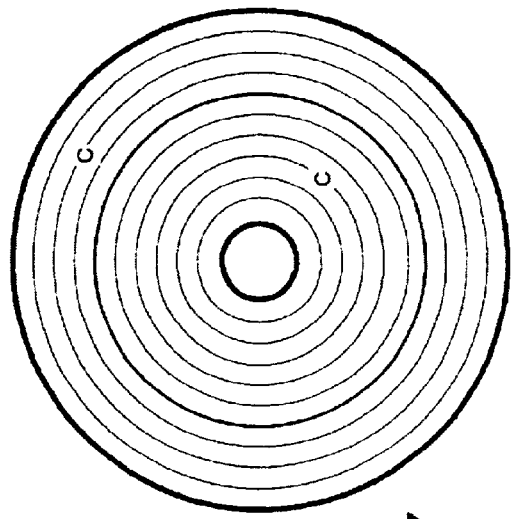

FIG. 5 through FIG. 7 illustrate alternate formats for a particular embodiment of the present invention. In FIG. 5–FIG. 7 a plurality of "tracks" defined on the disk surface are illustrated by concentric circles. When accessing a disk, the servo system reads servo position data recorded in predefined locations on the media that individually identify each track. Once read/write head 303 is located over or near a desired track, servo burst information recorded on the media is used to align read/write head 303 more precisely over a centerline of a particular track. This seek operation is time consuming, and the present invention is preferably implemented so that corresponding replicates are located on a common track (even where that track may be located on separate disks). In such a configuration, a replicate can be selected without incurring latency associated with a track change. However, single track changes (i.e., changing from a first track to an adjacent track) may not incur significant latency in a number of systems in which case locating replicates on adjacent tracks is acceptable.

In FIG. 5A, replicates "A" are located on a common disk surface, either on the same track as shown in FIG. 5A, or preferably on adjacent tracks as shown in FIG. 5B, at radially opposed locations. In other words, the replicates are mirrored about the spin axis 310 at locations 180 degrees from each other. This reduces read latency to about 50% as the disk will need only turn one-half rotation at most to reach any particular data. In other words, the virtual spin speed is 2× the actual spin speed. Although it is possible to use a split track design as shown in FIG. 5A (i.e. a single track containing both replicates), a single split track involves the most work in physical-to-logical mapping by the drive. Sector sparing and error handling are also negatively impacted. Hence, the adjacent track design shown in FIG. 5B is preferred.

In the implementation of FIG. 6, replicates "B" are mirrored at locations spaced 120 degrees from each other resulting in a 3× virtual spin speed. Any number of replicates can be provided, but the loss in total storage capacity will constrain the utility of additional replicates at some point.

FIG. 7 shows an alternative implementation where replicates are mirrored about a central diameter indicated in bold. One replicate "C" is formed on an inside diameter and one replicate "C" is formed on an outside diameter. In this implementation the replicates are obviously not located on the same track, but it is also not required that they be located on a common radius. Here, seek time is reduced because the number of tracks that must be crossed to reach any given data set is reduced. This implementation is expected to only marginally affect performance, however, because a large part of the seek latency cannot be eliminated simply by minimizing the throw distance of actuator 302.

Figure 8:
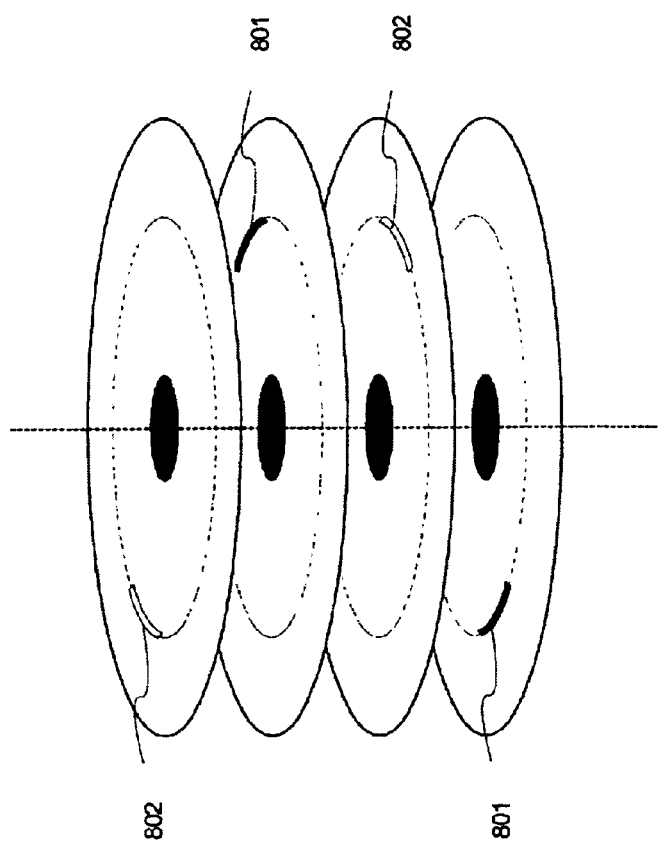
FIG. 8 shows perspective view of another alternate embodiment of the present invention.

FIG. 8 shows perspective view of another alternate embodiment of the present invention. The replicate locations shown in FIG. 5–FIG. 7 are illustrated on a single disk surface for ease of illustration, however, it should be understood that any of the configurations may be implemented across multiple disk surfaces and disks as shown in FIG. 8. Specifically, replicates 801 are positioned at radially opposed locations on separate disks as are replicates 802. This implementation provides an increased degree of reliability as damage of one disk will not destroy all replicates of the data. However short track seeks are becoming faster than head switches, hence, the total latency associated with accessing replicates from adjacent tracks is smaller than in accessing replicates on different disk surfaces.

FIG. 9 through FIG. 12 illustrate exemplary command definitions for an exemplary set of new commands added to implement features of the present invention. FIG. 9 illustrates a "Read Replicate" command, FIG. 10 shows a "Notify Replicate" command, FIG. 11 shows a "Notify Replicate Data" while FIG. 12 illustrates an "XDWriteRead" command that supports specific implementations in which the drive system in accordance with the present inventions is implemented in a RAID level 5 or advanced data guard (ADG) system.

The exemplary command definitions are based on the SCSI protocol. Because there are situations where the replicates are not coherent, the Read Replicates command described in FIG. 9 provides a mechanism to read a specific replicate. Preferably, the Read Replicates command will function as a normal 10-byte read operation, with the same limitations and behavior, with the exception of targeting a specific replicate. The fields shown in FIG. 9 have the following meaning:

Operation Code (C8h) is a group 6, vendor-specific command as defined by SCSI Architecture Model 2 (SAM2) revision 11. The operation code is subject to change depending on the needs of the hardware. The intention is to mimic the 10-byte SCSI Read command with only a change to the operation code and the reserved field in byte 6. The "relative addressing" (RELADR), "Force Unit Access" (FUA), "disable page out" (DPO), "Transfer Length", "Control" and "Logical Block Address" fields have the same meaning defined by the SCSI block commands (SBC) revision 8c.

The "Replicate Number" field contains the replicate number from which to read data. Replicates are numbered from 1 to Number of Replicates. A value of 0 will cause this command to be treated as a normal 10-byte read, operation code 28h. A value larger than the Number of Replicates will cause an error.

FIG. 10 shows details of a "Notify Replicate" command used to allow the controller to be notified when a replicate has been committed to media. The Notify replicate command will be issued for each of the replicates available in combination with any write command. When the specified replicate is committed to the media, the command will return with a successful response.

The Operation Code (C9h) is a group 6, vendor-specific command as defined by SAM2 revision 11. The operation code is subject to change depending on the needs of the hardware.

The FRC (Force Redundant Coherence) bit, when set, indicates that the Logical Block Address, Replicate Number, Replicate Source and Transfer Length are used to define the Redundant Data Entry (RDE) that must be completed at the same priority as a normal write operation. When the RDE-Only (Redundant Data Entry Only) is set, the Logical Block Address, Replicate Number, Replicate Source and Transfer Length are used to load a Redundant Data Entry (RDE) for the drive. The RDE associated with this command will be performed as a low priority operation. RRDE (Return Redundant Data Entry) indicates that the Logical Block Address, Replicate Number, Replicate Source and Transfer Length are ignored and should be 0. This bit will enable the target to return as data any of the RDEs on its internal completion stack. The host can use this mechanism to use a minimum number of outstanding commands to maintain the coherence of the target. Transfer Length defines the length of the data read or written. This should always be 0Eh in the particular examples. The "Control" has the meaning defined by SBC revision 8c.

Depending on the control bit definitions, the data for the Notify Replicate command, and example of which is shown in FIG. 11, may be either read from or written to the target. If the FRC or RDEOnly bits are set then the data is being written to the target. If RRDE is set, then the data is being read from the target. In FIG. 11, "Redundant Data Entry Length" defines the length of the shared portion of the Redundant Data Entry. The current definition is 13 bytes. "No Redundant Data Entry" (NoRDE) indicates when the RDE is incoherent, but is not defined in the WRDT. This condition is generated as the drive runs a coherence scan to indicate data corruption problems. The drive will return an unrecoverable read error in response to a normal read for this location until the host resolves the coherence.

The "Logical Block Address" field in FIG. 11 defines the starting location of the RDE. The "Replicate Source" field contains the identifier for the replicate that has the coherent data. The field may be 0 only if the FRC and RDEOnly fields are 0. "Replicate Number" indicates the replicate of the RDE while the "Transfer Length" defines the length of the RDE. The "Replicate Identifier" field holds a unique identifier for the RDE. This value will typically be 0, unless the host is attempting to uniquely identify an RDE because it is a duplicate.

The Logical Block Address, Transfer Length and Replicate Number define the redundant data entry (RDE). Overlapped or duplicate RDEs are possible. If a duplicate RDE is received, the target may immediately indicate that the previous RDE is completed. Optionally, the host may tag duplicate RDEs by using the Replicate Identifier. This will allow the host to determine which duplicate RDE is being completed. When the RRDE bit is set, the target will use the Notify Replicate command as a placeholder to return the next available completed RDE. The RDE returned must not already be associated with an outstanding Notify Replicate command.

FIG. 12 illustrates a proposed command, called an "XDWRITEREAD" command, used to improve the efficiency of the read prior to write operations required when supporting RAID 5 or ADG. The main benefit of the XDWRITEREAD command is that the bi-directional capability allows the read before write operation to be completed within a single rotation of the disk when redundant data is used. This optimization should be used when the data being retrieved is coherent on the disk. This command defines a field "Disable XOR" that disables the XOR operation on the returned read data. If this bit is cleared, then the read data would be XOR'd with the write data provided prior to return.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A rotating data storage disk system comprising:
   a plurality of concentric tracks defined on a disk;
   said disk including at least two date storage areas, wherein each area is sized to store a copy of a set of data and the data storage areas are substantially equidistantly spaced from each other and wherein all of the at least two data storage areas are located within plus or minus one track of the same track;
   a drive mechanism coupled to the disk;
   an integrated controller that manages data storage operations of the disk system, wherein the integrated controller maintains a first redundant data table in volatile memory, and wherein the first redundant data table comprises information about one or more deferred write commands; and,
   a remote controller in communication with the drive mechanism for maintaining data coherency between the at least two data storage areas and keeping track of deferred writes to the at least two data storage areas of the disk, wherein the remote controller maintains a second redundant data table in non-volatile memory, wherein the second redundant data table comprises information about one or more deferred write commands.

2. The rotating data storage disk of claim 1 wherein the at least two data storage areas are located at radially opposed locations at a substantially 180 degree angular offset with respect to a spin axis of the rotating data storage disk and mirrored across the spin axis.

3. The rotating data storage disk of claim 1 wherein the disk further comprises at least two magnetic recording surfaces, wherein the data storage areas are formed in a single one of the at least two magnetic recording surfaces.

4. The rotating date storage disk of claim 1 wherein the disk further comprises at least two magnetic recording surfaces, wherein the data storage areas are fanned in separate ones of the at least two magnetic recording surfaces.

5. The rotating data storage disk of claim 1 wherein the disk further comprises an optical recording surface.

6. The rotating data storage disk of claim 1 wherein the disk further comprises a magneto-optical recording surface.

7. The rotating data storage disk of claim 1 wherein the at least two data storage areas comprise "n" storage areas and the disk exhibits a characteristic virtual revolutions per minute (RPM) that is a multiple n of the actual spin speed of the rotating data storage disk.

8. The disk drive system of claim 1, wherein:
   in response to a read request from a host computer, the remote controller uses the second redundant data table to determine whether the read request references data on the disk drive that is coherent.

9. The disk drive system of claim 8 wherein the remote controller issues a SCSI read command if the read request references coherent data.

10. The disk drive system of claim 8, wherein the remote controller issues a modified read command if the read request references data that is not coherent, wherein the modified read command specifies a location on the disk drive from which to read the referenced data.

11. The disk drive system of claim 1, wherein:
    the integrated controller uses the information in the first redundant data table to perform a deferred write operation to one or more of the at least two data storage areas.

12. The disk drive system of claim 11 wherein, upon completion of the deferred write operation, the integrated controller:
    removes an entry corresponding to the deferred write operation from the first redundant data table; and
    transmits a notification to the remote controller indicating completion of the deferred write operation.

13. The disk drive system of claim 12 wherein, upon receipt of the notification, the remote controller removes an entry corresponding to the deferred write operation from the second redundant data table.

14. A disk drive system comprising:
    one or more platters, each platter supporting at least one recording surface, wherein the platters are aligned about a common central axis;

a plurality of concentric tracks defined on the platter means for spinning the platters about the common central axis;

a recording head associated with each recording surface;

an actuator mechanism coupled to each recording head to move the recording head into proximity with selected portions of the recording surface in response to received commands;

at least two replicates of data stored in at least two data storage areas such that any one of the at least two replicates can be accessed to service a data access request and all of the at least two data storage areas are located within plus or minus one track of the same track;

an integrated controller that manages data storage operations of the disk drive system, wherein the integrated controller maintains a first redundant data table in volatile memory, and wherein the first redundant data table comprises information about one or more deferred write commands; and, a remote controller for maintaining data coherency between the at least two data storage areas and keeping track of deferred writes to the data storage areas, wherein the remote controller maintains a second redundant data table in non-volatile memory, and wherein the second redundant data table comprises information about one or more deferred write commands.

15. The disk drive system of claim 14 wherein the data storage areas are located so as to be mirrored about a spin axis of the platters.

16. The disk drive system of claim 14 wherein the data storage areas are formed in a single one of the one or more platters.

17. The disk drive system of claim 14 wherein the data storage areas are formed in separate platters of the one or more platters.

18. The disk drive system of claim 14 wherein each recording surface further comprises a plurality of concentric tracks defined on the recording surface and each track is substantially aligned with a corresponding track on an adjacent platter, wherein all of the at least two data storage areas are located on adjacent tracks.

19. The disk drive system of claim 14 wherein the at least two data storage areas comprise "n" storage areas and the platter exhibits a characteristic virtual revolutions per minute (RPM) that is a multiple n of the actual spin speed of the rotating data storage platter.

20. The disk drive system of claim 14 further comprising:

a command processor having an interface to receive external disk access requests and coupled to provide the disk access request to the actuator mechanism; and memory coupled to the command processor and configured to store redundant write access request commands such that the at least two replicates can be stored asynchronously.

21. The disk drive system of claim 14, wherein:

in response to a read request from a host computer, the remote controller uses the second redundant data table to determine whether the read request references data on the platter that is coherent.

22. The disk drive system of claim 14, wherein:

the integrated controller uses the information in the first redundant data table to perform a deferred write operation to one or more of the at least two data storage areas.

23. The disk drive system of claim 22 wherein, upon completion of the deferred write operation, the integrated controller:

removes an entry corresponding to the deferred write operation from the first redundant data table; and transmits a notification to the remote controller indicating completion of the deferred write operation.

24. The disk drive system of claim 23 wherein, upon receipt of the notification, the remote controller removes an entry corresponding to the deferred write operation from the second redundant data table.

25. The disk drive system of claim 21 wherein the remote controller issues a SCSI read command if the read request references coherent data.

26. The disk drive system of claim 21, wherein the remote controller issues a modified read commend if the read request references data that is not coherent, wherein the modified read command specifies a location on the disk drive from which to read the requested data.

* * * * *